(12) United States Patent
Kootstra (10) Patent No.: US 7,713,007 B2
(45) Date of Patent: May 11, 2010

(54) METHOD AND APPARATUS FOR CONTAINING, STORING AND/OR TRANSPORTING CURVED WIND TURBINE ROTOR BLADES

(75) Inventor: Dirk-Jan Kootstra, Beekbergen (NL)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 11/756,079

(22) Filed: May 31, 2007

(65) Prior Publication Data

US 2008/0296197 A1 Dec. 4, 2008

(51) Int. Cl.
*B60P 3/022* (2006.01)
*B60P 3/40* (2006.01)
*B60P 3/00* (2006.01)
(52) U.S. Cl. .............................. 410/44; 410/45; 410/53
(58) Field of Classification Search ................. 410/44, 410/45, 53, 32–35, 120; 220/1.5
See application file for complete search history.

(56) References Cited

U.S. PATENT DOCUMENTS

| | | | | | |
|---|---|---|---|---|---|
| 1,996,695 | A | * | 4/1935 | Bigley, Jr. ..................... | 410/45 |
| 2,087,300 | A | * | 7/1937 | Ragonnet ..................... | 410/68 |
| 2,298,851 | A | * | 10/1942 | Wachter ..................... | 410/44 |
| 2,526,216 | A |  | 10/1950 | Gartner | |
| 5,044,846 | A |  | 9/1991 | Richardson | |
| 5,212,654 | A | * | 5/1993 | Deuar ..................... | 702/43 |
| 5,997,228 | A |  | 12/1999 | Potter | |
| 6,364,609 | B1 | * | 4/2002 | Barnes ..................... | 416/142 |
| 6,888,264 | B1 |  | 5/2005 | Willis et al. | |
| 7,210,882 | B2 |  | 5/2007 | Andersen et al. | |
| 2006/0180436 | A1 | * | 8/2006 | Heeszel et al. ............... | 198/587 |
| 2006/0251517 | A1 |  | 11/2006 | Grabau | |
| 2007/0290426 | A1 |  | 12/2007 | Trede et al. | |
| 2008/0277392 | A1 | * | 11/2008 | Sorensen et al. ............. | 220/1.5 |

FOREIGN PATENT DOCUMENTS

| | | |
|---|---|---|
| DE | 2510635 A1 | 9/1975 |
| DE | 8333043 U1 | 2/1984 |
| EP | 1813473 A2 | 8/2007 |
| WO | 02083523 A1 | 10/2002 |
| WO | 2005005286 A1 | 1/2005 |
| WO | 2006061806 A2 | 6/2006 |

OTHER PUBLICATIONS

European Search Report, EP08156606, dated Dec. 17, 2008, pp. 7.

* cited by examiner

*Primary Examiner*—Patricia L Engle
(74) *Attorney, Agent, or Firm*—James McGinness, Esq.; Armstrong Teasdale LLP (57) ABSTRACT

A retaining apparatus for securing curved wind turbine rotor blades for at least one of storage and transport is described. The retaining apparatus includes an end frame configured to be connected to a root of a first blade and a connecting frame having a first end and a second end. The first end of the connecting frame is rotatably connected to the end frame. The retaining apparatus also includes a portion configured to be positioned at least partially around a tip of a second blade. The portion is rotatably connected to the second end of the connecting frame. The retaining apparatus also includes a turnbuckle having a first end and a second end, wherein the first end of the turnbuckle is rotatably connected to the end frame, the second end of the turnbuckle rotatably connected to the second end of the connecting frame.

18 Claims, 9 Drawing Sheets

METHOD AND APPARATUS FOR CONTAINING, STORING AND/OR TRANSPORTING CURVED WIND TURBINE ROTOR BLADES

BACKGROUND OF THE INVENTION

This invention relates generally to transportation and storage of a wind turbine blade and more specifically, to methods and apparatus for containing, storing and/or transporting rotor blades.

Some known rotor blades, such as, but not limited to, wind turbine rotor blades used to generate electrical power from wind, can be rather large (e.g., some exceed 50 meters in length and 4 meters in width). Because of their size and/or fragility, these large rotor blades may be damaged during transportation from a rotor blade manufacturer to the location the rotor blades are used. For example, some known rotor blades may be damaged during loading into and/or unloading from at least some known transportation containers. Such damage may degrade performance of the blade.

Rotor blades may come in a variety of different sizes and shapes. Accordingly, at least some known transportation containers are sized to fit the largest blade, which may increase a weight and overall size of transporting smaller blades. An alternative to using containers uniformly sized to the largest blade is to provide different containers for differently sized blades. However, providing different containers may increase a cost and/or difficulty of transporting rotor blades, for example because of possible logistical difficulties of providing containers of the proper size for each shipment and/or additional manufacturing and/or design processes.

At least some known rotor blade transportation containers may be transported using more than one mode of transportation, for example by ship, truck, and/or rail. However, some modes of transportation may have restrictions on large loads, for example, limits defining a maximum height and/or width of the load. For example, when transporting large loads over land, the container height may sometimes be limited to about 4.0 meters. Height and/or width limits may facilitate ensuring containers clear bridges, overpasses, and/or other obstructions located on overland transportation routes. However, such limits may increase a difficulty of transporting more than one rotor blade in a single container, which may increase a cost of transportation.

BRIEF DESCRIPTION OF THE INVENTION

In one aspect, a method for securing curved wind turbine rotor blades for at least one of storage and transport is provided. The wind turbine rotor blades each have a root, a tip, and a convex face. The method comprises aligning a plurality of blades such that the root of a first blade is adjacent the tip of a second blade and the convex face of the second blade is adjacent the first blade, connecting an end frame of a retaining apparatus to the root of the first blade, positioning a portion of the retaining apparatus at least partially around the tip of the second blade, and operating a turnbuckle of the retaining apparatus to draw the tip of the second blade toward the root of the first blade.

In another aspect, a method for securing curved wind turbine rotor blades for at least one of storage and transport is provided. The wind turbine rotor blades each have a root, a tip, and a convex face. The method comprises aligning a plurality of blades such that the root of a first blade is adjacent the tip of a second blade and the convex face of the second blade is adjacent the first blade, connecting a retaining apparatus to the root of the first blade and the tip of the second blade, the retaining apparatus comprising a turnbuckle, and operating the turnbuckle to draw the tip of the second blade toward the root of the first blade.

In yet another aspect, a method for transporting a plurality of curved wind turbine rotor blades is provided. The method comprises aligning a plurality of blades such that the root of a first blade is adjacent the tip of a second blade and the convex face of the second blade is adjacent the first blade, and operating a turnbuckle to stress the second blade such that the tip of the second blade moves toward the root of the first blade.

In yet another aspect, a retaining apparatus for securing curved wind turbine rotor blades for at least one of storage and transport is provided. The retaining apparatus comprises an end frame configured to be connected to a root of a first blade, a connecting frame having a first end and a second end, the first end of the connecting frame rotatably connected to the end frame, a portion of the retaining apparatus configured to be positioned at least partially around a tip of a second blade, the portion rotatably connected to the second end of the connecting frame, the a turnbuckle having a first end and a second end, the first end of the turnbuckle rotatably connected to the end frame, the second end of the turnbuckle rotatably connected to the second end of the connecting frame.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
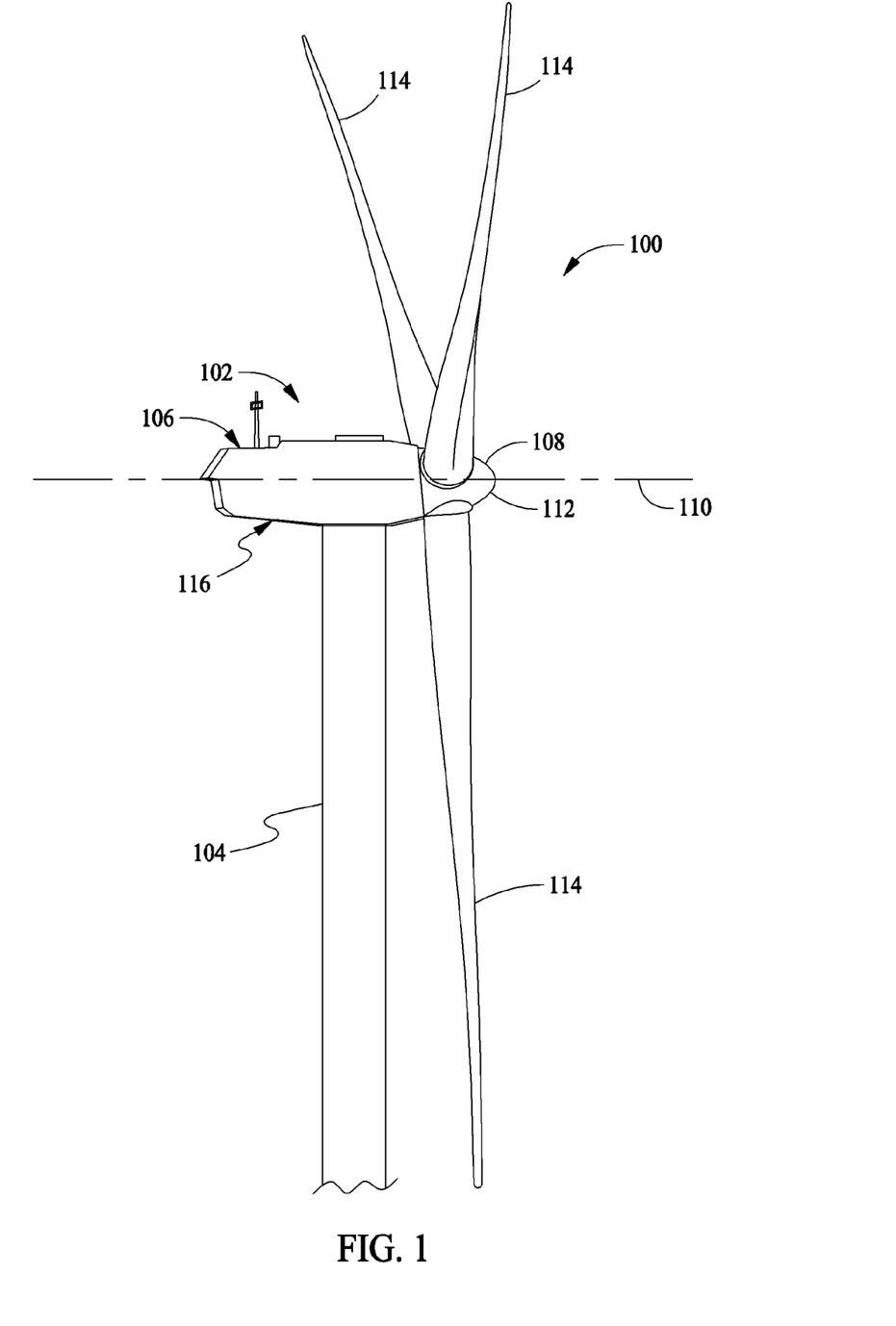
FIG. 1 is a perspective view of an exemplary wind turbine system.

FIG. 1 is a perspective view of an exemplary wind turbine system 100. Specifically, wind turbine system 100 described and illustrated herein includes a wind generator 102 for generating electrical power from wind energy. However, in some embodiments, wind turbine system 100 may include, in addition or alternative to wind generator 102, any type of wind turbine, such as, but not limited to, a windmill (not shown). Moreover, wind turbine system 100 described and illustrated herein includes a horizontal-axis configuration. However, in some embodiments, wind turbine system 100 may include, in addition or alternative to the horizontal-axis configuration, a vertical-axis configuration (not shown). Wind turbine system 100 may be coupled to a power grid (not shown) for receiving electrical power therefrom to drive operation of wind turbine system 100 and/or its associated components and/or for supplying electrical power generated by wind turbine system 100 thereto. Although only one wind turbine system 100 is shown in FIG. 1, in some embodiments a plurality of wind turbine systems 100 may be grouped together, sometimes referred to as a "wind farm".

In some embodiments, wind generator 102 is mounted on a tower 104, however, in some embodiments wind turbine system 100 includes, in addition or alternative to tower-mounted wind generator 102, a wind generator (and/or other type of wind turbine) adjacent the ground and/or a surface of water. The height of tower 104 may be selected based upon factors and conditions known in the art. Wind generator 102 includes a body 106, sometimes referred to as a "nacelle", and a rotor (generally designated by 108) coupled to body 106 for rotation with respect to body 106 about an axis of rotation 110. Rotor 108 includes a hub 112 and a plurality of blades 114 (sometimes referred to as "airfoils") extending radially outwardly from hub 112 for converting wind energy into rotational energy. Although rotor 108 is described and illustrated herein as having three blades 114, rotor 108 may have any number of blades 114. Blades 114 may each have any length and/or width.

Despite how rotor blades 114 are illustrated in FIG. 1, rotor 108 may have blades 114 of any shape, type and/or configuration, whether described and/or illustrated herein. In an alternative embodiment, another type of rotor blade 114 is utilized on a ducted rotor (not shown) having a turbine (not shown) contained within a duct (not shown). Moreover, wind turbine system 100 may, in some embodiments, be a wind turbine wherein rotor 108 generally faces upwind to harness wind energy, and/or may be a wind turbine wherein rotor 108 generally faces downwind to harness energy. Of course, in any embodiment, rotor 108 may not face exactly upwind and/or downwind, but may face generally at any angle (which may be variable) with respect to a direction of the wind to harness energy therefrom.

Wind generator 102 includes an electrical generator 116 coupled to rotor 108 for generating electrical power from the rotational energy generated by rotor 108. Generator 116 may be any suitable type of electrical generator, such as, but not limited to, a wound rotor induction generator. General operation of electrical generator 116 to generate electrical power from the rotational energy of rotor 108 is known in the art and therefore will not be described in more detail herein. In some embodiments, wind turbine system 100 may include one or more control systems (not shown), actuating mechanisms, and/or sensors (not shown) coupled to some or all of the components of wind generator 102 for generally controlling operation of wind generator 102 and/or as some or all of the components thereof (whether such components are described and/or illustrated herein). For example, control system(s), actuating mechanism(s), and/or sensor(s) may be used for, but are not limited to, overall system monitoring and control including, for example, pitch and speed regulation, high-speed shaft and yaw brake application, yaw and pump motor application, and/or fault monitoring. Alternative distributed or centralized control architectures may be used in some embodiments. General operation of wind turbine system 100, and more specifically wind generator 102, is known in the art and therefore will not be described in more detail herein.

Figure 2:
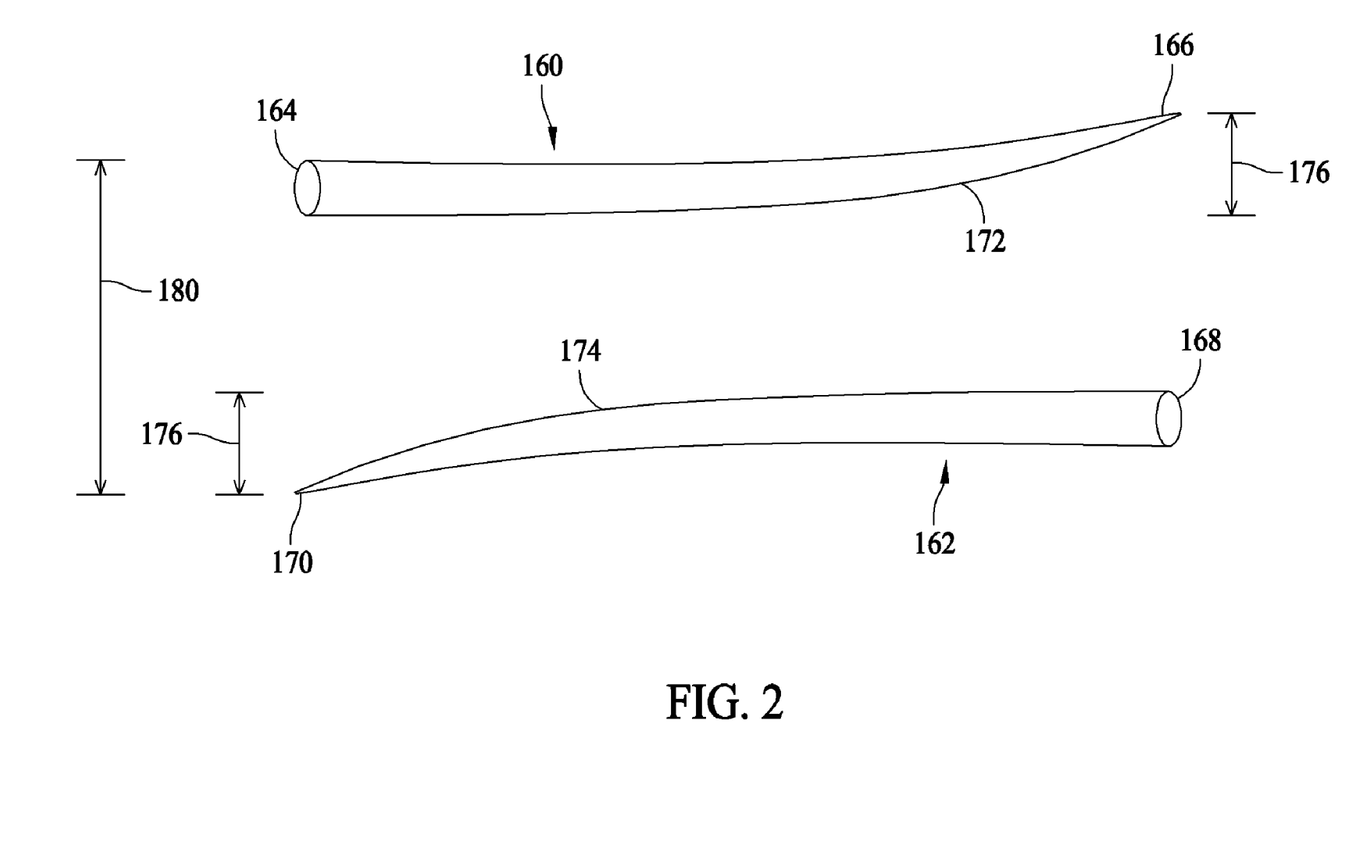
FIG. 2 is a top plan view of a pair of exemplary wind turbine blades.

FIG. 2 is a top plan view of a pair of exemplary wind turbine blades 160 and 162. As described above, blade 160 has a root 164 and a tip 166. Blade 162 also has a root 168 and a tip 170. Blades 160 and 162 are curved wind turbine blades and the curve forms a convex face 172 and 174, respectively, on each blade. It is advantageous to reduce a width 176 of blades 160 and 162 when storing and/or transporting blades 160 and 162. Reducing width 176 reduces the amount of storage space necessary to store blades 160 and 162 and eases transport due to the reduced size of the cargo.

Blades 160 and 162 are aligned such that root 164 of blade 160 is adjacent tip 170 of blade 162 and root 168 of blade 162 is adjacent tip 166 of blade 160. Blades 160 and 162 are also aligned such that convex face 172 is adjacent convex face 174. Due to the large size of blades 160 and 162, blades are typically transported individually, for example, one blade transported by a tractor trailer. It would be financially advantageous to transport multiple blades simultaneously. To transport multiple blades simultaneously, the blades are aligned as described above and fastened together. A combined width 180 must be within size limitations set by, for example, a government agency charged with regulating a particular mode of transportation. One exemplary method of reducing width 180 is to bend blades 160 and 162, which reduces the curve in each of blades, therefore reducing width 180.

Figure 3:
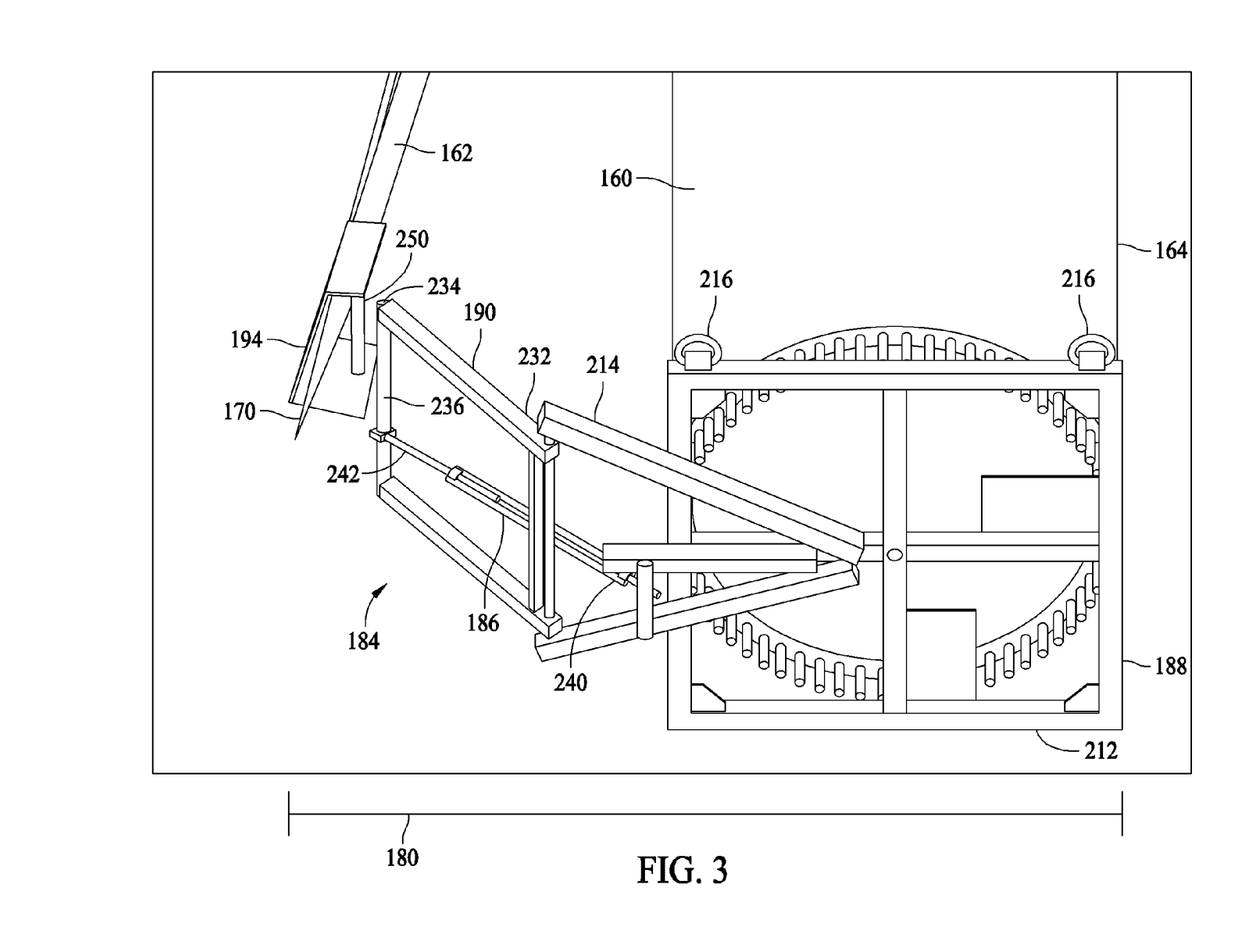
FIG. 3 is a perspective view of a pair of exemplary wind turbine blades including a first embodiment of a retaining apparatus that includes a turnbuckle.

FIG. 3 is a perspective view of exemplary wind turbine blades 160 and 162 including a first embodiment of a retaining apparatus 184 that includes a turnbuckle 186. Retaining apparatus 184 also includes an end frame 188, a connecting frame 190, a fastening device (not shown in FIG. 3), and a tip protection cover 194.

End frame 188 is removably attached to root 164 of first turbine blade 160. In one specific example, end frame 188 is bolted to first turbine blade 160 such that first turbine blade 160 cannot rotate with respect to end frame 188 or separate from end frame 188 without action by a user. In an exemplary embodiment, end frame 188 is also connected to a transportation apparatus (not shown in FIG. 3). For example, a bottom portion 212 of end frame 188 is connected to a flat-bed semi-truck trailer. In another example, bottom portion 212 of end frame 188 is connected to a flat-bed railway car. In another example, bottom portion 212 of end frame 188 is connected to a shipping container. And in yet another example, a bottom portion 212 of end frame 188 is connected to a set of wheels, which in combination with a second set of wheels positioned under tip 166 of first turbine blade 160 and root 168 of second turbine blade 162, facilitate transport of the pair of turbine blades 160 and 162 using the strength of turbine blades 160 and 162 for support.

End frame 188 includes an attachment frame 214 that extends outward past an outer edge of first turbine blade 160. End frame 188 also includes hoisting eyes 216, or any other component that provides an attachment area for lifting end frame 188 and a pair of turbine blades. In an alternative embodiment, multiple pairs of turbine blades are stackable on top of one another. Stacking aids in storage and transport of turbine blades.

As described above, retaining apparatus 184 includes connecting frame 190, which includes a first end 232 and a second end 234. First end 232 is rotatably connected to attachment frame 214, for example, using a hinge. Second end 234 includes a fastening support 236, which in the embodiment of FIG. 3, is a pole.

Retaining apparatus 184 also includes turnbuckle 186. A first end 240 of turnbuckle 186 is rotatably connected to attachment frame 214, for example, by a pivot point or a hinge. A second end 242 of turnbuckle 186 is rotatably connected to second end 234 of connecting frame 190, for example, also by a pivot point or a hinge.

In one embodiment, turnbuckle 186 is a commonly available part. As turnbuckle 186 is rotated, first end 240 of turnbuckle 186 is drawn closer to second end 242 of turnbuckle 186. Due to the positions at which turnbuckle 186 and connecting frame 190 are rotatably connected to attachment frame 214, as turnbuckle 186 is rotated and shortened, second end 234 of connecting frame 190 is drawn closer to turbine blade 160. More specifically, as turnbuckle 186 is rotated and shortened, connecting frame 190 pivots about the connection with attachment frame 214. Both first end 240 and second end 242 of turnbuckle 186 also pivot about the connections with attachment frame 214 and connecting frame 190, respectively.

Retaining apparatus 184 also includes tip protection cover 194 that at least partially surrounds tip 170 of second turbine blade 162. In an exemplary embodiment, tip protection cover 194 is formed from metal, however, tip protection cover 194 may be formed from any material with the strength necessary to withstand the forces applied by retaining apparatus 184. Tip protection cover includes a fastening support 250 that when positioned on second turbine blade 162, is adjacent to convex face 174. In the embodiment of FIG. 3, fastening support 250 is a pole. Fastening support 250 is connected to a cover portion, which in combination with fastening support 250, forms an opening configured to accept and at least partially surround tip 170. In an exemplary embodiment, fastening support 250 and the cover portion are formed from a single piece of material. In another exemplary embodiment, fastening support 250 and the cover portion are formed from multiple pieces of material that are connected, for example, by welding.

In operation, tip 170 is positioned within tip protection cover 194, and fastening support 236 of connecting frame 190 is positioned adjacent fastening support 250 of tip protection cover 194. A fastening device (not shown in FIG. 3) rotatably connects fastening support 236 to fastening support 250, and therefore, tip protection cover 194 to connecting frame 190. Tip protection cover 194 includes, in one embodiment, padding (not shown in FIG. 3) positioned between tip protection cover 194 and blade tip 170 to protect blade tip 170 from scratches, dents, or other types of damage. In one embodiment, this padding is at least one of a foam and carpet. In an exemplary embodiment, tip protection cover 194 surrounds blade tip 170 on four sides, of which three sides are covered with padding. Padding may also be positioned between first turbine blade 160 and second turbine blade 162 to prevent damage.

Figure 4:
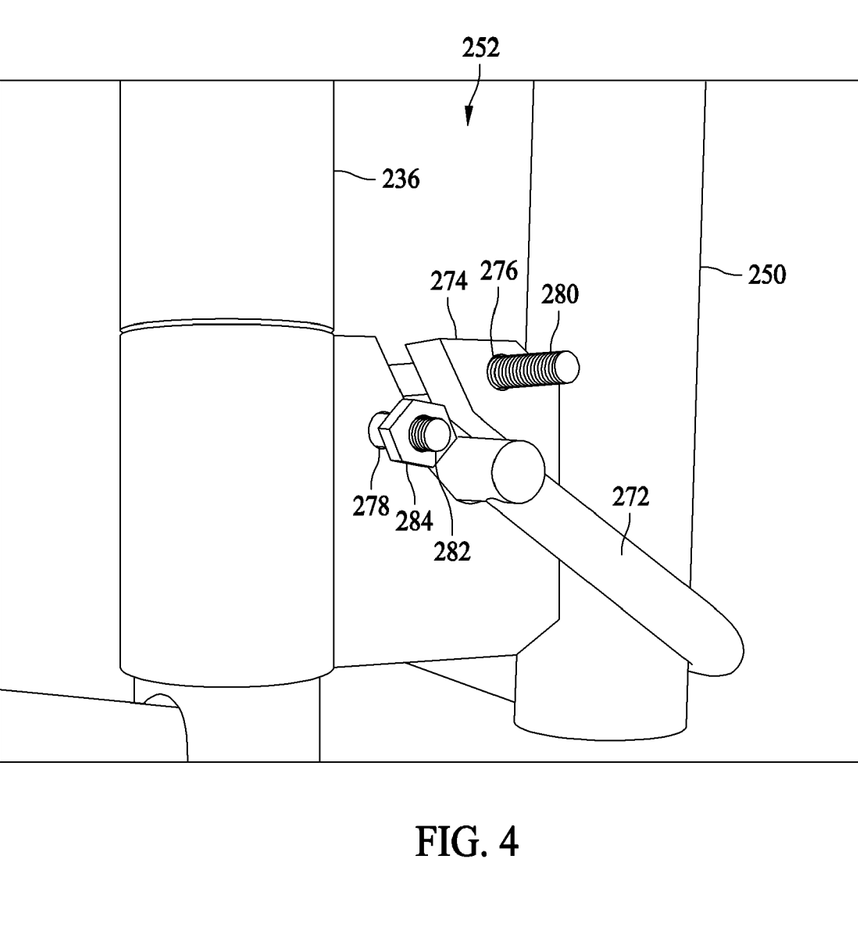
FIG. 4 is a perspective view of a fastening device of the retaining apparatus of FIG. 3.

FIG. 4 is a perspective view of an exemplary fastening device 252 of retaining apparatus 184 (shown in FIG. 3). Fastening device 252 includes a ring, for example a D-ring 272, which in combination with a saddle 274 rotatably connects fastening support 236 of connecting frame 190 to fastening support 250 of tip protection cover 194. Saddle 274 opens upwards, which allows gravity and the force applied to D-ring 272, to keep D-ring 272 within saddle 274. Saddle 274 also includes openings 276 and 278 through which a hairpin safety pin 280 is placed to lock D-ring 272 within saddle 274. Pin 280 includes a threaded area 282 and a nut 284 that hold safety pin 280 within openings 276 and 278.

Figure 5:
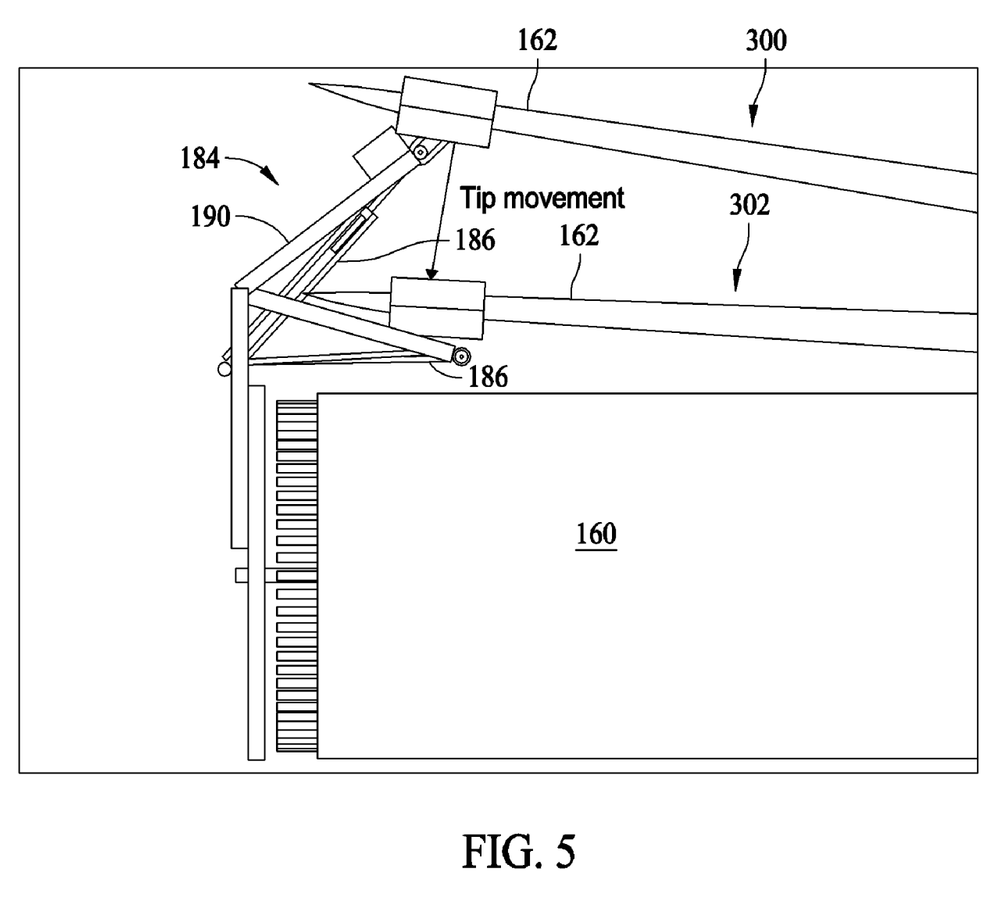
FIG. 5 is a top plan view of a pair of exemplary wind turbine blades including the retaining apparatus of FIGS. 3 and 4.

FIG. 5 is a top plan view of turbine blades 160 and 162 that include retaining apparatus 184 (shown in FIGS. 3 and 4). FIG. 5 illustrates turbine blade 162 in two states, an unstressed state 300 and a stressed state 302. Unstressed state 300 is the natural state for a curved wind turbine blade such as turbine blade 162. Turbine blade 162 must be forced into stressed state 302. As described above, turnbuckle 186 is rotated in a direction that shortens turnbuckle 186, which draws tip protection cover 194 toward turbine blade 160 and forces blade 162 into stressed state 302.

Figure 6:
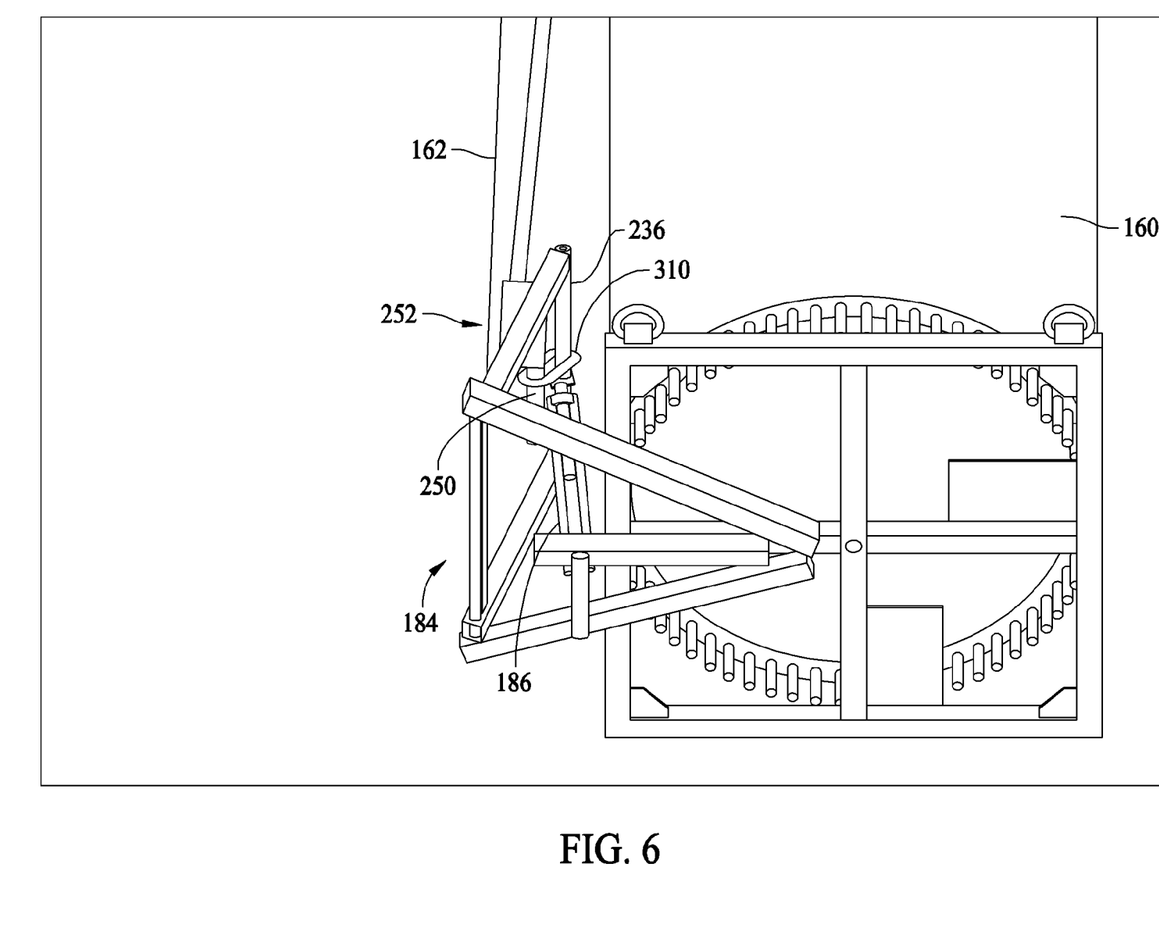
FIG. 6 is a perspective view of a pair of exemplary wind turbine blades including the retaining apparatus of FIGS. 3-5, a wind turbine blade held in a stressed state.

FIG. 6 is a perspective view of turbine blades 160 and 162 including retaining apparatus 184 (shown in FIGS. 3-5), where blade 162 is held in stressed state 302. In the embodiment of FIG. 6, fastening device 252 includes a ring 310 rotatably connecting fastening support 236 to fastening support 250.

Figure 7:
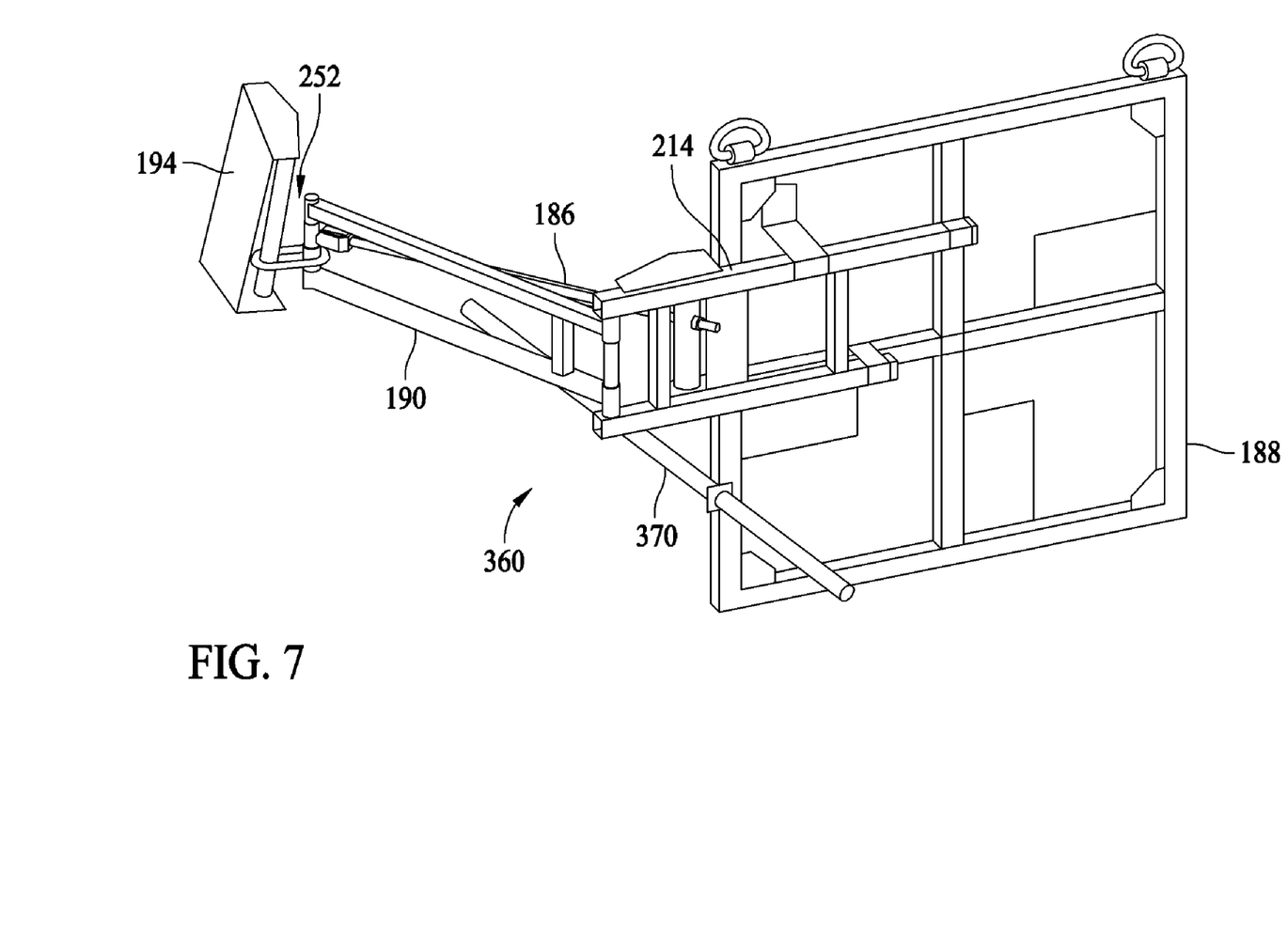
FIG. 7 is a perspective view of a second embodiment of a retaining apparatus that includes a turnbuckle.

FIG. 7 is a perspective view of a second embodiment of a retaining apparatus 360 that includes a turnbuckle 186. Retaining apparatus 360 includes similar components to retaining apparatus 184, and like components are given like reference numbers.

Figure 8:
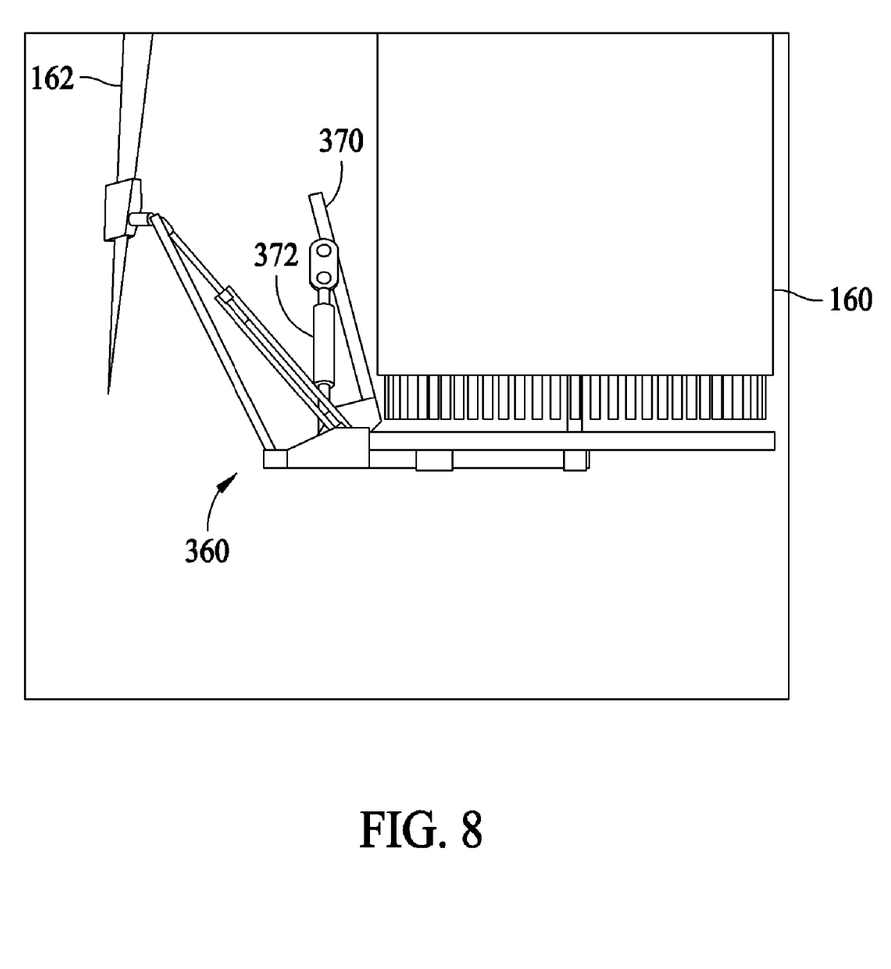
FIG. 8 is a top plan view of a pair of exemplary wind turbine blades including the retaining apparatus of FIG. 7.

FIG. 8 is a top plan view of two turbine blades 160 and 162 and retaining apparatus 360. Retaining apparatus 360 includes a lifting beam 370 and a lifting beam turnbuckle 372.

Figure 9:
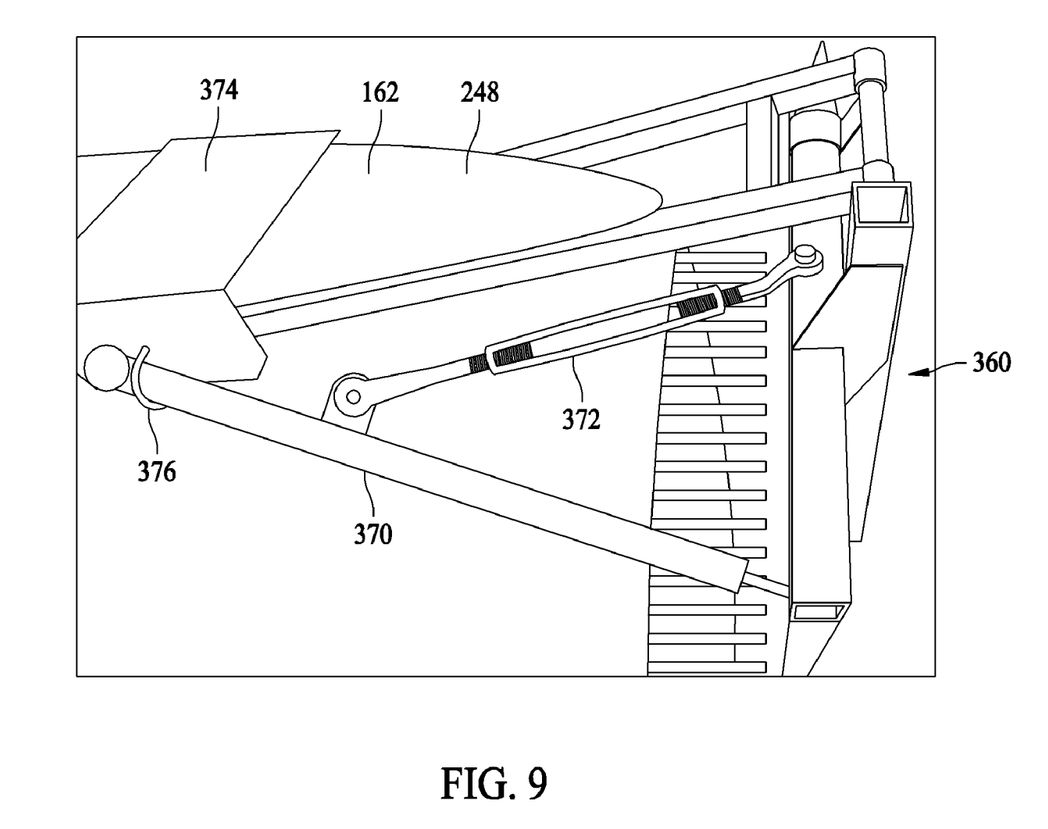
FIG. 9 is a perspective view of the retaining apparatus of FIGS. 7 and 8 holding a wind turbine blade in a stressed state.

FIG. 9 is a perspective view of turbine blade 162 maintained in a stressed state by retaining apparatus 360. A tip protection cover 374 includes a fastener 376 extending from a bottom of tip protection cover 374 and forming an opening. Once blade 162 is forced into the stressed state, lifting beam 370 is positioned within fastener 376. Lifting beam turnbuckle 372 is rotated to position blade tip 170 at a desired height.

Retaining assemblies 184 and 360 are described herein releasably attached to a root of a first blade and connected to a tip of a second blade using a tip protection cover. Retaining assemblies 184 and 360 can be used in pairs, one assembly attached to a root of a first blade and a tip of a second blade, and a second assembly attached to a root of the second blade and a tip of the first blade. The pair of retaining assemblies holds both blades in a stressed state, prepared for storage and/or transport.

Turnbuckle 186 of retaining apparatus 184 and 360 allow turbine blade 162 to be held in stressed state 302 without the use of straps, ropes, cables, bands, or any other devices wrapped around a pair of turbine blades and tightened to hold a turbine blade in a stressed state. With these types of devices, there is a risk that the devices become damaged and will not hold the blade in a stressed state. Also, wrapping, for example, a steel cable around both a blade root and an adjacent blade tip at the tension necessary to hold a blade in a stressed state may cause damage to the surface of the blade or blade laminates.

Turnbuckle 186 allows an operator to position him/herself away from the sweep area of the turbine blade being stressed. The operator positions him/herself by the end frame, where turnbuckle 186 is attached to attachment frame 188. Turnbuckle 186 allows an operator to stress blade 162, and also release blade 162 back to an unstressed state, in a steady and controlled manner.

The above-described and/or illustrated fixtures, assemblies, and methods are cost-effective and efficient for supporting and/or transporting rotor blades. In some embodiments, the fixtures, assemblies, and methods support more than one blade while still being sized, shaped, and/or weighted to comply with at least some restrictions on predetermined size, shape, and/or weight loads. As such, the fixtures, assemblies, and methods may facilitate reducing a cost of transporting rotor blades as compared with at least some known transportation containers and/or methods that only transport one blade because they otherwise would not comply with at least some restrictions. Such size and/or shape configurations that comply with at least some restrictions on predetermined sized and/or shaped loads may also facilitate transportation using more than one different mode of transportation.

Although the fixtures, assemblies, and methods described and/or illustrated herein are described and/or illustrated with respect to rotor blades, and more specifically wind turbine rotor blades, practice of the fixtures, assemblies, and methods described and/or illustrated herein is not limited to wind turbine rotor blades, nor rotor blades. Rather, the fixtures, assemblies, and methods described and/or illustrated herein are applicable to transporting any load.

When introducing elements/components/etc. of the fixtures, assemblies, and methods described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for securing curved wind turbine rotor blades for at least one of storage and transport, the wind turbine rotor blades each having a root, a tip, and a convex face, said method comprising:
    aligning a plurality of blades such that the root of a first blade is adjacent the tip of a second blade and the convex face of the second blade is adjacent the first blade;
    connecting an end frame of a retaining apparatus to the root of the first blade, the retaining apparatus including a connecting frame rotatably coupled to the end frame, a tip protection cover rotatably coupled to the connecting frame, and a turnbuckle coupled between the end frame and the connecting frame;
    positioning the tip protection cover of the retaining apparatus at least partially around the tip of the second blade; and
    operating the turnbuckle of the retaining apparatus to draw the tip of the second blade toward the root of the first blade.

2. A method according to claim 1 wherein operating a turnbuckle comprises providing a user access to the turnbuckle at a position outside of a sweep area of the second blade.

3. A method according to claim 1 wherein aligning a plurality of blades further comprises positioning a pad between the first and the second blade, the pad configured to prevent damage to the rotor blades.

4. A method according to claim 1 wherein positioning the tip protection cover of the retaining apparatus further comprises positioning a pad between the retaining apparatus and the second blade.

5. A method according to claim 1 wherein connecting an end frame of a retaining apparatus comprises bolting the end frame to the root of the first blade.

6. A method for securing curved wind turbine rotor blades for at least one of storage and transport, the wind turbine rotor blades each having a root, a tip, and a convex face, said method comprising:
    aligning a plurality of blades such that the root of a first blade is adjacent the tip of a second blade and the convex face of the second blade is adjacent the first blade;
    connecting an end frame of a retaining apparatus to the root of the first blade and a tip protection cover of the retaining apparatus to the tip of the second blade, the retaining apparatus further comprising a connecting frame rotatably coupled to the end frame and the tip protection cover, and a turnbuckle operatively coupled to the end frame and the connecting frame; and
    operating the turnbuckle to draw the tip of the second blade toward the root of the first blade.

7. A method according to claim 6 wherein operating a turnbuckle comprises providing a user access to the turnbuckle at a position outside of a sweep area of the second blade.

8. A method according to claim 6 further comprising positioning at least one pad between at least one of the first and the second blades, and the retaining apparatus and the second blade, the at least one pad configured to prevent damage to the rotor blades.

9. A method according to claim 6 wherein connecting an end frame of a retaining apparatus to the root of the first blade comprises bolting the end frame to the root of the first blade.

10. A method according to claim 6 further comprising:
    connecting a second retaining apparatus to the root of the second blade and the tip of the first blade, the retaining apparatus comprising a second turnbuckle; and
    operating the second turnbuckle to draw the tip of the first blade toward the root of the second blade.

11. A method according to claim 10 wherein connecting a second retaining apparatus comprises connecting an end frame of the second retaining apparatus to the root of the second blade and positioning a portion of the second retaining apparatus at least partially around the tip of the first blade.

12. A retaining apparatus for securing curved wind turbine rotor blades for at least one of storage and transport, said retaining apparatus comprising:
    an end frame configured to be connected to a root of a first blade;
    a connecting frame having a first end and a second end, said first end of said connecting frame rotatably connected to said end frame;
    a portion of said retaining apparatus configured to be positioned at least partially around a tip of a second blade, said portion rotatably connected to said second end of said connecting frame; and
    a turnbuckle having a first end and a second end, said first end of said turnbuckle rotatably connected to said end frame, said second end of said turnbuckle rotatably connected to said second end of said connecting frame.

13. A retaining apparatus according to claim 12 that does not utilize a strap, a rope, a cable, a band, or any other devices wrapped around a pair of turbine blades and tightened to hold it in a stressed state.

14. A retaining apparatus according to claim 12 wherein said end frame further comprises at least one attachment component for use in lifting at least one of said end frame and said turbine blades.

15. A retaining apparatus according to claim 12 further comprising a second turnbuckle and lifting apparatus configured to position said second blade at a desired height.

16. A retaining apparatus according to claim 12 wherein said portion of said retaining apparatus configured to be positioned at least partially around a tip of a second blade further comprises a pad positioned between said retaining apparatus and said second blade.

17. A retaining apparatus according to claim 12 wherein said portion of said retaining apparatus configured to be positioned at least partially around a tip of a second blade comprises a fastening device configured to rotatably connect said portion of said retaining apparatus to said connecting frame.

18. A retaining apparatus according to claim 17 wherein said fastening device comprises at least one of a D-ring and a pin configured to secure said D-ring to said fastening device.

\* \* \* \* \*